US010418876B2

(12) United States Patent
Hayamizu et al.

(10) Patent No.: US 10,418,876 B2
(45) Date of Patent: Sep. 17, 2019

(54) COMPRESSOR AND HEAT CYCLE SYSTEM FOR REFRIGERATOR

(71) Applicant: AGC Inc., Chiyoda-ku (JP)

(72) Inventors: Hiroki Hayamizu, Tokyo (JP); Masato Fukushima, Tokyo (JP); Hirokazu Takagi, Tokyo (JP); Tetsuo Otsuka, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/106,306

(22) Filed: Aug. 21, 2018

(65) Prior Publication Data

US 2018/0358861 A1 Dec. 13, 2018

Related U.S. Application Data

(63) Continuation of application No. PCT/JP2017/004057, filed on Feb. 3, 2017.

(30) Foreign Application Priority Data

Feb. 22, 2016 (JP) .................. 2016-031193

(51) Int. Cl.
*H02K 5/136* (2006.01)
*F04B 39/00* (2006.01)
(Continued)

(52) U.S. Cl.
CPC ............. *H02K 5/136* (2013.01); *F04B 39/00* (2013.01); *F04B 39/12* (2013.01); *F04B 49/10* (2013.01);
(Continued)

(58) Field of Classification Search
CPC .......... F04B 39/00; F04B 39/12; F04B 49/10; F04C 2210/263; F04C 2240/30;
(Continued)

(56) References Cited

U.S. PATENT DOCUMENTS 5,348,455 A * 9/1994 Herrick ................. F04C 18/324
418/248
6,006,542 A * 12/1999 Tojo ..................... C10M 107/24
62/114
(Continued)

FOREIGN PATENT DOCUMENTS

DE 1 229 671 B2 12/1966
JP 60-206998 10/1985
(Continued)

OTHER PUBLICATIONS

International Search Report dated Apr. 11, 2017 in PCT/JP2017/004057 filed Feb. 3, 2017 (with English Translation).
(Continued)

*Primary Examiner* — Julio C. Gonzalez
*Assistant Examiner* — Rashad H Johnson
(74) *Attorney, Agent, or Firm* — Oblon, McClelland, Maier & Neustadt, L.L.P.

(57) ABSTRACT

A compressor includes a sealed container, a compression part provided in an upper part of the inside of the sealed container and configured to compress a working medium, an oil reservoir part provided in a bottom part of the inside of the sealed container and configured to reserve a lubricating oil therein, an electric drive part provided between the compression part and the oil reservoir part inside the sealed container and configured to drive the compression part, and a power source terminal provided to pass through a wall surface of the sealed container in a region of the oil reservoir part. The power source terminal is connectable to an external power source outside the sealed container and electrically connected to the electric drive part via a lead wire in the sealed container.

18 Claims, 3 Drawing Sheets

(51) Int. Cl.

| | | |
|---|---|---|
| *F04B 39/12* | (2006.01) | |
| *F04B 49/10* | (2006.01) | |
| *F04C 29/00* | (2006.01) | |
| *F04C 29/02* | (2006.01) | |
| *H02K 5/22* | (2006.01) | |
| *H02K 7/14* | (2006.01) | |
| *F04C 18/02* | (2006.01) | |
| *F25B 31/02* | (2006.01) | |

(52) U.S. Cl.
CPC .......... *F04C 29/0085* (2013.01); *F04C 29/02* (2013.01); *H02K 5/225* (2013.01); *H02K 7/14* (2013.01); *F04C 18/0215* (2013.01); *F04C 2210/263* (2013.01); *F04C 2240/30* (2013.01); *F04C 2240/40* (2013.01); *F04C 2240/809* (2013.01); *F04C 2270/70* (2013.01); *F25B 31/026* (2013.01); *F25B 2400/12* (2013.01); *F25B 2500/06* (2013.01)

(58) Field of Classification Search
CPC ............ F04C 2240/40; F04C 2240/809; F04C 2240/70; F04C 29/0085; F04C 29/02; F25B 2400/12; F25B 2500/06; F25B 31/026
USPC .......................................... 310/53, 54, 58, 71
See application file for complete search history.

(56) References Cited

U.S. PATENT DOCUMENTS

| | | | | |
|---|---|---|---|---|
| 6,089,834 A | * | 7/2000 | Ozu | H02K 7/14 417/356 |
| 6,863,563 B2 | * | 3/2005 | Daniel | H02K 3/50 310/71 |
| 2002/0025265 A1 | * | 2/2002 | Ikeda | F04B 39/06 417/410.1 |
| 2002/0159904 A1 | * | 10/2002 | Ebara | F04C 18/3564 418/11 |
| 2003/0124004 A1 | * | 7/2003 | Dreiman | F04B 35/04 417/366 |
| 2014/0070132 A1 | | 3/2014 | Fukushima | |
| 2016/0320111 A1 | | 11/2016 | Saikusa et al. | |
| 2017/0138642 A1 | | 5/2017 | Ueno et al. | |

FOREIGN PATENT DOCUMENTS

| | | |
|---|---|---|
| JP | 03-194173 | 8/1991 |
| JP | 03-242477 | 10/1991 |
| WO | WO 2009/083359 A1 | 7/2009 |
| WO | WO 2012/157764 A1 | 11/2012 |
| WO | WO 2015/136703 A1 | 9/2015 |
| WO | WO 2015/136977 A1 | 9/2015 |
| WO | WO 2016/024576 A1 | 2/2016 |

OTHER PUBLICATIONS

Written Opinion dated Apr. 11, 2017 in PCT/JP2017/004057 filed Feb. 3, 2017.

Ya. A. Lisochkin, et al., "Explosive-Hazard Estimates for Several Fluorine-Containing Monomers and Their Mixtures, Based on the Minimum Ignition Pressure with a Fixed Igniter Energy," Combustion, Explosion, and Shock Waves, vol. 42, No. 2, 2006, pp. 140-143.

* cited by examiner

COMPRESSOR AND HEAT CYCLE SYSTEM FOR REFRIGERATOR

TECHNICAL FIELD

The present invention relates to a compressor and a heat cycle system.

BACKGROUND ART

Chlorofluorocarbons (CFCs), e.g., chlorotrifluoromethane and dichlorodifluoromethane, and hydrochlorofluorocarbons (HCFCs), e.g., chlorodifluoromethane, have conventionally been used as working media for heat cycling, such as, for example, working media for refrigerators, working media for air conditioners, wording media for electric-power generation systems (e.g., waste heat recovery power generation), working media for latent-heat transfer devices (e.g., heat pipes), and secondary refrigerants. However, it is pointed out that such CFC and HCFC affect the ozone layer of the stratosphere, and use of these compounds is restricted at present.

Under these circumstances, hydrofluorocarbons (HFCs) which less affect the ozone layer, such as difluoromethane (HFC-32), tetrafluoroethane, and pentafluoroethane (HFC-125), have come to be used as working media for heat cycling in place of the CFCs or HCFCs. For example, R410A (pseudoazeotropic-mixture working medium composed of HFC-32 and HFC-125 in a mass ratio of 1:1) is a working medium which is widely used. However, it is pointed out that HFC may be a cause of global warming.

R410A is widely used in common air conditioners including the so-called packaged air conditioners and air conditioners for domestic use because of the high refrigerating capacity thereof. However, R410A has a global warming potential (GWP) as high as 2088, and it is desired to develop a low-GWP working medium.

Recently, hydrofluoroolefins (HFOs), i.e., HFC having a carbon-carbon double bond, have come to be attracting attention as a promising working medium which less affects the ozone layer and less affects the global warming, because the carbon-carbon double bonds thereof are apt to be cleaved by OH radicals present in the air. In this description, a saturated HFC is referred to as HFC and distinguished from an HFO, unless otherwise indicated. There are cases where an HFC is referred to as a "saturated hydrofluorocarbon". Although halogenated hydrocarbons such as HFC and HFO are each indicated by the compound name accompanied by an abbreviation thereof in parentheses, abbreviations only are often used in place of the compound names in this description according to need.

With respect to a working medium including an HFO, Patent Document 1, for example, discloses a technique concerning a working medium including 1,1,2-trifluoroethylene (HFO-1123), which has those properties and brings about excellent cycle performance. Patent Document 1 indicates that for the purpose of enhancing the noncombustibility, cycle performance, etc. of that working medium, it was attempted to use HFO-1123 in combination with any of various HFC to obtain a working medium.

It is known that in cases when HFO-1123 is used alone, the HFO-1123 decomposes by itself at a high temperature or a high pressure if there is an ignition source. There is a report in Non-Patent Document 1 that an attempt was made to inhibit the self-decomposition reaction by mixing HFO-1123 with another ingredient, e.g., vinylidene fluoride, to obtain a mixture having a reduced HFO-1123 content.

Patent Document 2 proposes to use HFO-1123 alone as a working medium in heat cycle systems and to use a mixture of HFO-1123 with HFC-32 or a mixture of HFO-1123 with HFO-1234yf as a working medium.

PRIOR ART DOCUMENTS

Patent Documents

Patent Document 1: International Publication WO 2012/157764
Patent Document 2: International Publication WO 2015/136703

Non-Patent Document

Non-Patent Document 1: Combusion, Explosion, and Shock Waves, Vol. 42, No. 2, pp. 140-143, 2006

SUMMARY OF THE INVENTION

Problem that the Invention is to Solve

It is necessary to take into account that in the case of using a working medium including a hydrofluoroolefin such as HFO-1123 in a heat cycle system, the hydrofluoroolefin may undergo a self-decomposition reaction when ignition energy is given, due to an abnormal operation, etc., to the working medium exposed to a high temperature or a high pressure.

In a heat cycle system, the place where a certain degree of ignition energy is highly likely to be given to the working medium in a high-temperature high-pressure environment is mainly the inside of the compressor. In the case where ignition energy is generated in the compressor by a factor such as, for example, the occurrence of a discharge (spark) at the power source terminal, this ignition energy may be given to the working medium to cause the self-decomposition reaction.

Accordingly, an object of the present invention is to provide a compressor and a heat cycle system which are capable of preventing the power source terminal in the compressor from generating a spark and of thereby preventing the working medium from undergoing a self-decomposition reaction.

Means for Solving the Problem

In order to accomplish the object, a compressor according to one aspect of the present invention includes
a sealed container,
a compression part provided in an upper part of the inside of the sealed container and configured to compress a working medium,
an oil reservoir part provided in a bottom part of the inside of the sealed container and configured to reserve a lubricating oil therein,
an electric drive part provided between the compression part and the oil reservoir part inside the sealed container and configured to drive the compression part, and
a power source terminal provided to pass through a wall surface of the sealed container in a region of the oil reservoir part, the power source terminal being connectable to an external power source outside the sealed container and electrically connected to the electric drive part via a lead wire in the sealed container.

A heat cycle system according to another aspect of the present invention includes a working-medium circuit to which the compressor is connected and through which a working medium including an HFO circulates.

Effect of the Invention

According to the present invention, the power source terminal within the compressor is prevented from generating a spark and the working medium can be prevented from undergoing the self-decomposition reaction caused by the sparking.

MODES FOR CARRYING OUT THE INVENTION

Modes for carrying out the present invention are explained below by reference to the drawings.

Figure 1:
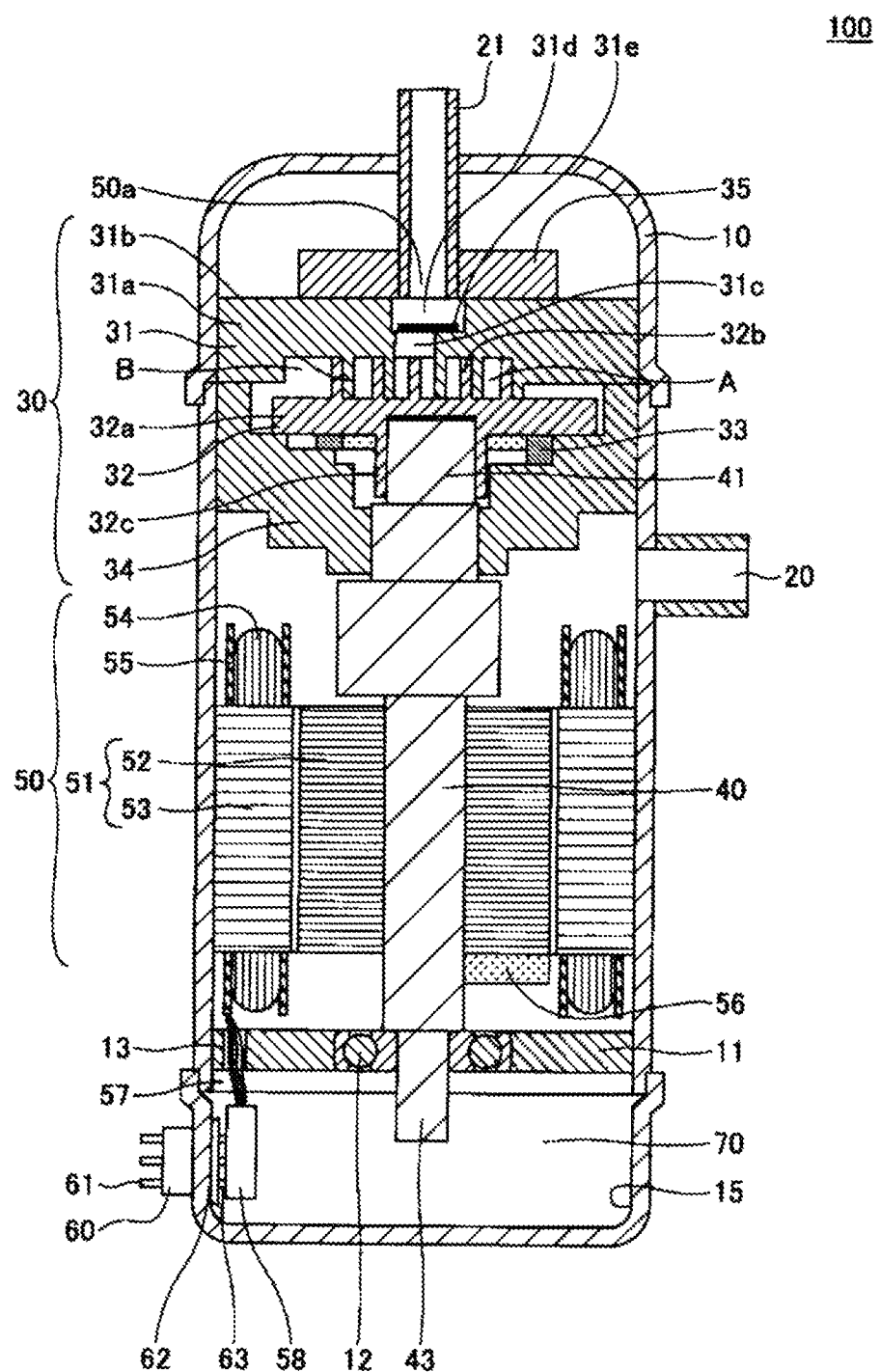
FIG. 1 is a sectional view showing the configuration of a compressor according to an embodiment of the present invention.

FIG. 1 is a sectional view showing the configuration of a compressor 100 according to an embodiment of the present invention. The compressor of the invention is applicable to various compressors such as scroll compressors and rotary compressors so long as such compressors each include a compression part provided above and an electric drive part provided below. The embodiment explained below is an example in which the compressor of the invention is applied to a scroll compressor.

The compressor 100 includes a sealed container 10, a suction pipe 20, a discharge pipe 21, a compression part 30, a shaft 40, an electric drive part 50, and a power source terminal 60.

The sealed container 10 serves as a casing of the compressor 100 to contain the compression part 30, shaft 40, electric drive part 50, power source terminal 60, etc. The compressor 100 includes an oil reservoir part 15 formed in a bottom part of the sealed container 10, and a lubricating oil (refrigerating machine oil) 70 is reserved therein. The lubricating oil 70 is supplied, via oil distribution channels (not shown) provided in the shaft 40, to sliding portions such as components of the compression part 30 and the bearings so that the compression part 30 can perform smooth compression.

The power source terminal 60 is provided in the oil reservoir part 15 to pass through the sealed container 10 via an insulating member 62. The power source terminal 60, which is for supplying electric power to the electric drive part 50 within the sealed container 10 from an external power source, includes an external terminal 61 and an internal terminal 63. The external terminal 61 is a terminal for receiving electric power supplied from an external power source (not shown) outside the sealed container 10, and is provided outside the sealed container 10. The internal terminal 63 is a terminal for supplying electric power to the electric drive part 50 and is provided inside the sealed container 10. The internal terminal 63 is provided on the inner circumferential surface of the sealed container 10 in the region of the oil reservoir part 15, and comes into the state of being immersed in the lubricating oil 70. Consequently, the lubricating oil 70, which has exceedingly high insulating properties, comes to interpose between the internal terminals 63, thereby eliminating the possibility of sparking between the terminals. Due to this configuration, the working medium can be prevented from undergoing a self-decomposition reaction which can be caused by sparking. Details of this configuration will be described later, and other constituent elements are explained below.

The suction pipe 20 is a pipe for sucking a working medium into the sealed container 10, and is provided to the sidewall of the sealed container 10 to communicate between the inside and the outside of the sealed container 10. A gaseous working medium which is sucked into the sealed container 10 via the suction pipe 20 is led to the compression part 30 while cooling the electric drive part 50.

The compression part 30 serves to compress to a given pressure the working medium sucked into the sealed container 10, and is provided above the electric drive part 50. In the compressor 100 according to this embodiment, the compression part 30 is not limited in the structure thereof, and the compression part 30 can have any of various structures so long as the compression part 30 is provided above the electric drive part 50. An example of compression parts 30 to which the compressor 100 according to this embodiment is applicable is explained below.

The compression part 30 includes a fixed scroll 31, a rocking scroll 32, an Oldham's ring 33, a frame 34, and a discharge-pipe connection part 35. The fixed scroll 31 is provided above and the rocking scroll 32 is provided below, so as to face each other. The frame 34, which is for retaining the rocking scroll 32 therein, is provided under the rocking scroll 32. The discharge-pipe connection part 35 is provided over the fixed scroll 31. The Oldham's ring 33 is provided beneath the rocking scroll 32. The fixed scroll 31 and the rocking scroll 32 include respective spiral objects, which will be described later, and these spiral objects form spaces therebetween. These spaces are: a closed space, which serve as a compression chamber A; and a space serving as a suction chamber B, which is open to and communicate with the inside of the sealed container 10.

The fixed scroll 31 and the rocking scroll 32, in cooperation, compress the working medium. The fixed scroll 31 includes a base plate 31a provided approximately horizontally and a fixed spiral object 31b extending upright downward from the lower surface of the base plate 31a.

The base plate 31a is a flat-plate-shaped member fixed within the sealed container 10. The outer periphery of the base plate 31a is in contact with the inner circumferential surface of the sealed container 10, and a peripheral edge part of the lower surface of the base plate 31a is in contact with an upper part of the frame 34. A discharge port 31c, through which the working medium compressed in the compression chamber A is discharged, and a communication part 31d, which is capable of communicating with the discharge port 31c, formed in a central part of the base plate 31a.

The discharge port 31c is provided so as to extend along the upside/downside direction of the base plate 31a so that one end thereof communicates with the compression chamber A and the other end communicates with the connection part 31d. A discharge valve 31e is provided between the discharge port 31c and the communication part 31d and is attached so as to cover the discharge port 31c.

During the period when the pressure inside the compression chamber A is lower than a give pressure (the pressure within the communication part 31d), the discharge valve 31e keeps the discharge port 31c closed to inhibit the working medium from flowing out from the compression chamber A into the discharge pipe 21. At the time when the pressure inside the compression chamber A has increased to or above the given pressure (the pressure within the communication part 31d), the discharge valve 31e is pushed up to open the discharge port 31c, thereby permitting the working medium to flow into the discharge pipe 21.

The discharge-pipe connection part 35 connects the discharge pipe 21 to the compression part 30 and serves to make the discharge pipe 21 and the communication part 31d communicate with each other.

The discharge pipe 21 is a pipe for discharging the working medium compressed by the compression part 30 from the sealed container 10.

The rocking scroll 32 includes a base plate 32a which is approximately horizontal, a rocking spiral object 32b extending upright upward from the upper surface of the base plate 32a, and a boss 32c extending downward from the lower surface of the base plate 32a.

The base plate 32a is constituted of a disk-shaped member, and is driven via the boss 32c, which will be described later, by the eccentric rotation of an eccentric part 41 in accordance with the rotation of the shaft 40. The base plate 32a thus rocks (swirls) within the frame 34.

Figure 2:
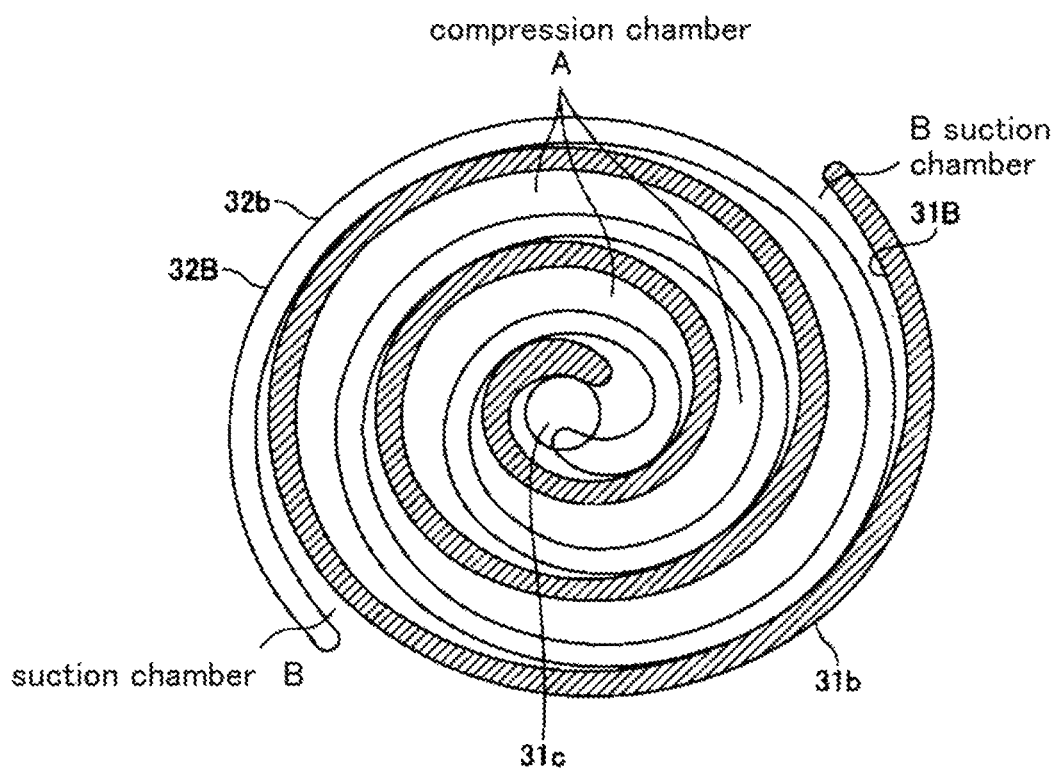
FIG. 2 is a horizontal sectional view of a fixed spiral object and a rocking spiral object.

FIG. 2 is a horizontal sectional view of the fixed spiral object 31b and the rocking spiral object 32b. As shown in FIG. 2, the fixed spiral object 31b and the rocking spiral object 32b both have a spiral shape, i.e., the shape of an involute curve, and are provided so as to face each other. The fixed spiral object 31b of the fixed scroll 31 is in a fixed state, and the rocking spiral object 32b of the rocking scroll 32 is rocked (swirled) by the rotation of the shaft 40. As a result, the working medium is compressed while moving inward from the outer side, and the compressed working medium is discharged upward from the central discharge port 31c.

FIG. 1 is explained again. The boss 32c has a hollow cylindrical shape formed on the lower surface of the base plate 32a. A cylindrical eccentric part 41 provided at the upper end of the shaft 40 is retained in a slidable state in the boss 32c. Namely, the rotation of the shaft 40 drives the rocking scroll 32 via the eccentric part 41 retained in the boss 32c.

The frame 34 slidably retains the rocking scroll 32 therein. Consequently, the upper surface of the frame 34 and the lower surface of the base plate 32a of the rocking scroll 32 are sliding surfaces. The frame 34 has a shape which is open at upper and lower parts thereof. The upper part is closed by the disposition of the base plate 31a of the fixed scroll 31, and the shaft 40 and the eccentric part 41 are retained in the lower part. The outer periphery thereof is fixed to the inner circumferential surface of the sealed container 10.

The Oldham's ring 33 is provided beneath the lower surface of the base plate 32a of the rocking scroll 32 and has a mechanism which inhibits the rocking scroll 32 from rotating on its own axis during the rocking. The Oldham's ring 33 thus serves to cause the rocking scroll 32 to make a rocking movement (swirling) only.

The compression chamber A is a space formed by the lower surface of the base plate 31a and the fixed spiral object 31b and by the upper surface of the base plate 32a and the rocking spiral object 32b. A plurality of compression chambers A are formed as closed spaces in accordance with the number of spiral turns of the fixed spiral object 31b and that of the rocking spiral object 32b. As FIG. 2 shows, the suction chamber B is formed at an outer-end part of the fixed spiral object 31b and rocking spiral object 32b by the inner surface of the sidewall of the frame 34, the outer periphery of the base plate 32a, the inner circumferential surface 31B of the fixed spiral object 31b, and the outer circumferential surface 32B of the rocking spiral object 32b. The suction chamber B communicates with the inside of the sealed container 10. Consequently, the working medium which has flowed into the frame 34 of the sealed container 10 from the space beneath the frame 34 is sucked into the suction chamber B. In accordance with the rotation of the shaft 40, the suction chamber B becomes a space (compression chamber A) closed by the fixed spiral object 31b and the rocking spiral object 32b. The working medium is thus compressed continuously in accordance with the rotation of the shaft 40.

Other constituent elements are explained below by reference to FIG. 1 again.

The electric drive part 50 produces power, which rotates the shaft 40 and thereby drives the compression part 30. The electric drive part 50 thus supplies power (energy) for compressing a working medium. The electric drive part 50 includes a motor 51. The motor 51 includes a stator 53 fixed to and supported by the sealed container 10 and a rotor 52 mounted on the shaft 40, in combination.

The stator 53 is configured, for example, of a laminated core and a stator winding 54 having a plurality of phases with an insulating member 55 interposed therebetween.

The rotor 52, for example, includes a permanent magnet (not shown) inside and is mounted on the shaft 40 so as to form a given gap between the rotor 52 and the inner circumferential surface of the stator 53. By causing electric current to flow through the stator winding 54, a rotating magnetic field generates within the stator 53 to rotate the rotor 52, i.e., rotate the shaft 40 integrated therewith. A balancer 56 may be provided in the rotor 52 for diminishing any unbalance caused by the movement of the rocking scroll 32 and Oldham's ring 33.

Electric current is supplied to the stator winding 54 via a lead wire 57, of which one end is connected to a stator winding 54 and another end is connected to a connector 58. The connector 58 is connected to the internal terminal 63 of the power source terminal 60. Upon electric-power supply from an external power source (not shown) to the power source terminal 60, electric current flows through the stator windings 54 via the internal terminal 63, connector 58, and lead wire 57 in this order.

A sub-frame 11 is provided under the electric drive part 50 so as to partition the space inside the sealed container 10. Beneath the sub-frame 11 is formed a space serving as the oil reservoir part 15, thereby forming a structure for reserving a lubricating oil 70. The sub-frame 11 includes, in a central part thereof, a bearing 12 whereby the lower end of the shaft 40 is rotatably supported. A through hole 13 for passing the lead wire 57 therethrough is formed in a peripheral edge part of the sub-frame 11 The through hole 13 is provided in order to enable electric power (electric current) to be supplied from the power source terminal 60 provided under the sub-frame 11 to the electric drive part 50. The through hole 13 is intended to facilitate passing of the lead wire 57.

The electric drive part 50 is provided between the compression part 30 and the oil reservoir part 15, that is, provided under the compression part 30 and over the oil reservoir part 15. This arrangement enables the electric drive part 50 to be provided near the oil reservoir part 15.

The power source terminal 60, which is a terminal for supplying electric power (electric current) to the electric drive part 50 as stated above, is provided so that the internal terminal 63 is immersed in the lubricating oil 70 reserved in the oil reservoir part 15. Thus, the internal terminal 63 can have enhanced electrical insulating properties and can be prevented from generating a spark. Usually, internal terminals 63 have exposed metallic-terminal portions which are adjacent to each other, and the exposed metallic-terminal portion provided adjacently to each other are in the state of being capable of generating a spark. The connector 58, which is connected to the internal terminal 63, and at least a part of the lead wire 57 are immersed in the refrigerating machine oil. Thus, not only the lead wire 57 can be inhibited from suffering damage to the covering (dielectric breakdown) caused by abnormal heat generation within the compressor but also sparking can be prevented.

In this embodiment, the power source terminal 60 is configured so that the internal terminal 63 is immersed in a lubricating oil 70 to keep the exposed metallic-terminal portion, which is adjacent to each other, in the state of being highly insulated by the lubricating oil. That is, the power source terminal 60 is provided in a region where the oil reservoir part 15 is provided, and is configured so that the internal terminal 63 is reliably immersed in the lubricating oil 70. This configuration, in which the internal terminal 63 is immersed in the lubricating oil 70, makes the connector 58, which is connected to the internal terminal 63, at least a part of the lead wire 57, and the exposed metallic-terminal portion immersed in the lubricating oil 70 as a matter of course, and these parts and portions can be likewise inhibited from causing abnormal heat generation and be highly electrically insulated. In a general compressor, the power source terminal 60 is provided at a portion in the sidewall of the sealed container 10 above the sub-frame 11 and most close to the stator windings 54, and is hence in the state of being prone to come into direct contact with the gaseous working medium. There is a possibility that the power source terminal 60 might generate a spark, depending on the properties (e.g., dielectric constant) of the working medium, resulting in the occurrence of a self-decomposition reaction of the working medium. In this embodiment, the internal terminal 63 is immersed in the lubricating oil 70 as shown in FIG. 1, and the working medium is rendered extremely less apt to undergo a self-decomposition reaction by the high electrical insulating properties of the lubricating oil 70.

The power source terminal 60 may be provided at any position including the bottom of the sealed container 10, so long as the exposed metallic-terminal portion of the internal terminal 63 is immersed in the lubricating oil 70. However, when ease of disposition and direct placement of the compressor 100 on the floor are taken into account, it is preferred to provide the power source terminal 60 at the sidewall of the sealed container 10. This configuration renders the compressor 100 capable of being directly placed on the floor and facilitates the operation of connecting to an external power source and installation of the compressor 100.

As the lubricating oil (refrigerating machine oil) 70, use can be made, without particular limitations, of any of known refrigerating machine oils which are used as compositions for heat cycle systems together with working media including halogenated hydrocarbons. Specific examples of usable refrigerating machine oils include oxygen-containing-compound refrigerating machine oils (e.g., ester-based refrigerating machine oils and ether-based refrigerating machine oils), fluorochemical refrigerating machine oils, mineral-oil-based refrigerating machine oils, and hydrocarbon-based refrigerating machine oils.

How the compressor 100 works is explained briefly below.

An explanation is given with reference to FIG. 1. Electric power (electric current) is supplied to the power source terminal 60 from an external power source (not shown), and upon the power supply, electric current flows through the stator winding 54 via the internal terminal 63 immersed in the lubricating oil 70 and via the lead wire 57 connected thereto. A rotating magnetic field hence generates to rotate the rotor 52, and the shaft 40 rotates accordingly.

The eccentric part 41 lying at the upper end of the shaft 40 swirls with the rotation of the shaft 40 to cause the rocking scroll 32 to rock. As a result, the volume of the closed space (compression chamber A) formed by the fixed spiral object 31*b* and the rocking spiral object 32*b* decreases as the shaft 40 rotates.

While the rocking scroll 32 is in the state of rocking, a gaseous working medium is sucked into the sealed container 10 through the suction pipe 20. The sucked gaseous working medium enters the suction chamber B included in the compression part 30. The sucked gaseous is then compressed in the compression chamber A which becomes a closed space as the shaft 40 rotates, and gradually increases in pressure. At the time when the pressure in the compression chamber A exceeds a given pressure (pressure in the communication part 31*d*), the discharge valve 31*e* opens upward. The working medium hence flows out through the discharge port 31*c*, the discharge valve 31*e*, and then the communication part 31*d* and is discharged from the sealed container 10 via the discharge pipe 21.

Throughout the period when the compressor 100 is thus working, there is no fear of sparking at the exposed metallic-terminal portion of the internal terminal 63 of the power source terminal 60. Consequently, even when the working medium includes an HFO, the compressor 100 can stably work continuously.

Next, the heat cycle system according to an embodiment of the present invention is explained. The heat cycle system according to this embodiment employs the compressor 100 according to this embodiment.

Figure 3:
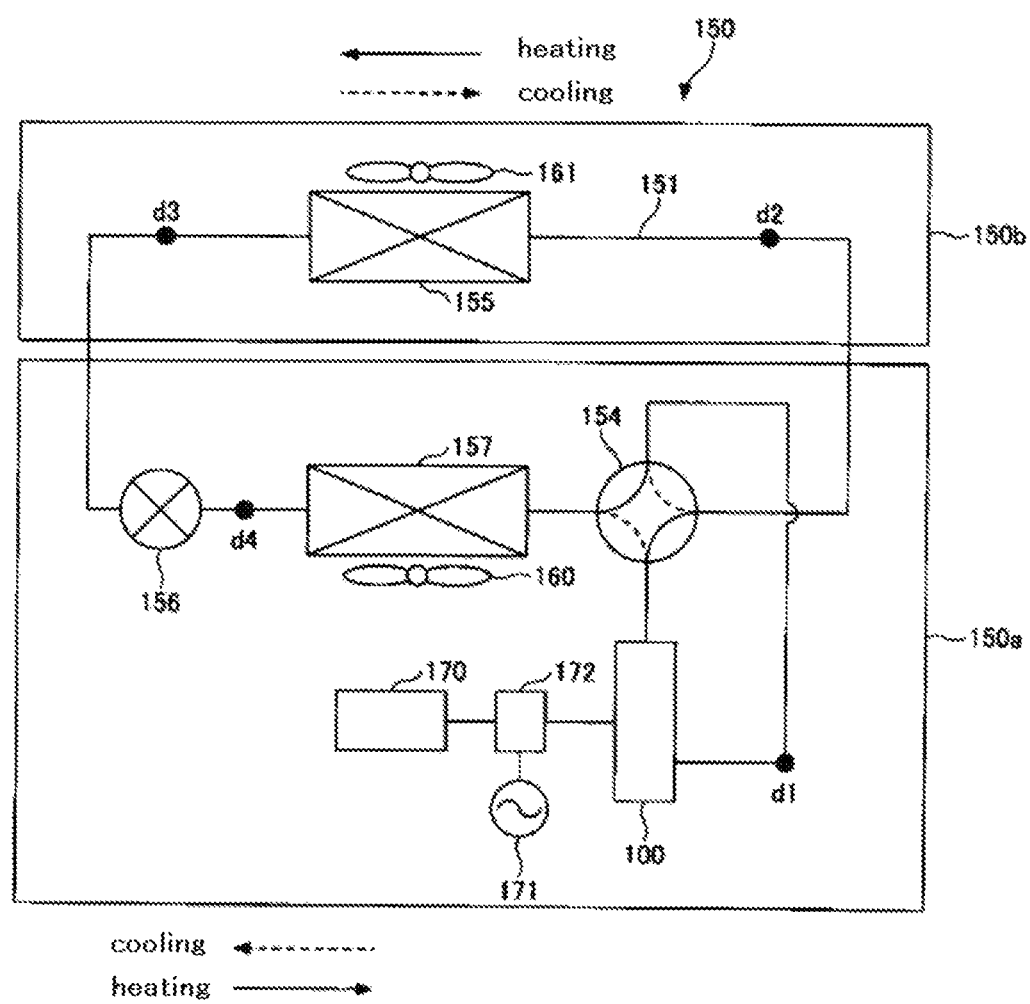
FIG. 3 is a view showing an air conditioner as an example of a heat cycle system according to an embodiment of the present invention.

An air conditioner 150 is explained below as an example of the heat cycle system of the invention with reference to FIG. 3. FIG. 3 is a view showing an air conditioner 150 as an example of a heat cycle system according to an embodiment of the present invention.

As shown in FIG. 3, the air conditioner 150 includes an outdoor unit 150*a* and an indoor unit 150*b*. A compressor 100 as a compression mechanism, a four-way selector valve 154, an expansion valve 156 as an expansion mechanism, and an outdoor heat exchanger 157 which are included in the outdoor unit 150*a* and an indoor heat exchanger 155 included in the indoor unit 150*b* are connected by piping to configure a channel 151 for circulating a working medium.

The outdoor heat exchanger 157 includes a fan 160, and the indoor unit 150*b* includes a fan 161. Air blowing by the fans 160 and 161 enables the outdoor heat exchanger 157 and the indoor heat exchanger 155 to perform heat exchange between the working medium circulating through the channel 151 and the surrounding atmosphere.

The direction of the circulation of the working medium can be reversed by operating the four-way selector valve 154. This air conditioner 150 can hence be operated to perform both cooling and heating.

The air conditioner 150 includes a power supply device 172, such as an inverter power source, for supplying electric power to the compressor 100 and with a controller 170 which controls the power supply device 172. Electric power from an AC power source 171 is supplied to the power supply device 172 and then to the electric drive part 50 of the compressor 100 via the power source terminal 60 thereof to cause electric current to flow through the stator windings 54.

How the air conditioner 150 is operated is roughly explained below.

In a heating operation, the four-way selector valve 154 is set as indicated by the solid lines in FIG. 3. In cases when the compressor 100 is operated with the valve 154 in that state, the indoor heat exchanger 155 functions as a condenser and the outdoor heat exchanger 157 functions as a vaporizer, constituting a refrigerating cycle.

The high-temperature high-pressure working medium discharged from the compressor 100 passes through the four-way selector valve 154 (point d2 in FIG. 3) and flows into the indoor heat exchanger 155, where the working medium emits heat to the indoor air and condenses (point d3 in FIG. 3). The condensed high-pressure working medium is depressurized with the expansion valve 156 to become a low-pressure working medium (point d4 in FIG. 3), which flows into the outdoor heat exchanger 157.

The low-pressure working medium which has flowed into the outdoor heat exchanger 157 is a gas/liquid mixture in a two-phase state (gaseous phase/liquid phase) and is apt to absorb heat and vaporize. This working medium absorbs heat from the outdoor air to vaporize. The vaporized low-pressure working medium passes through the four-way selector valve 154 and the point d1 in FIG. 3 and returns to and sucked in the compressor 100. The sucked low-pressure working medium is compressed to become a high-temperature high-pressure working medium again, and discharged. The air conditioner 150 performs heating while repeating the operation.

In a cooling operation, the four-way selector valve 154 shifts the channel (as indicated by the broken lines in FIG. 3). The working medium hence flows in the direction completely reverse to that in the heating operation, and the functions of the heat exchangers also are reversed (the indoor heat exchanger 155 is a vaporizer and the outdoor heat exchanger 157 is a condenser).

Next, the working medium to be used in the compressor 100 and heat cycle system according to embodiments of the invention is explained.

The working medium to be used in the compressor 100 and heat cycle system according to embodiments of the invention may be any of conventionally known working media as stated hereinabove. However, working media containing a hydrofluoroolefin (HFO) are preferred. Examples of the HFO include trifluoroethylene (HFO-1123), 2,3,3,3-tetrafluoropropene (HFO-1234yf), 1,2-difluoroethylene (HFO-1132), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze (Z)), and 3,3,3-trifluoropropene (HFO-1243zf). The working medium preferably includes HFO-1234yf, HFO-1234ze (E), or HFO-1234ze(Z), more preferably includes HFO-1234yf or HFO-1123, and especially preferably includes HFO-1123.

The working medium to be used in the invention preferably includes HFO-1123, and may further contain the optional ingredients which will be shown later, according to need. When the amount of working medium is taken as 100% by mass, the content of HFO-1123 in the working medium is desirably 10% by mass or higher, preferably 20 to 80% by mass, more preferably 40 to 80% by mass, even more preferably 40 to 60% by mass.

(HFO-1123)

The working-medium characteristics of HFO-1123 are shown in Table 1 in terms of comparison with those of, in particular, R410A (pseudoazeotropic-mixture working medium composed of HFC-32 and HFC-125 in a mass ratio of 1:1). Cycle performance is indicated by the coefficient of performance and refrigerating capacity which are determined by the methods that will be described later. The coefficient of performance and refrigerating capacity of HFO-1123 are given as relative values (hereinafter referred to as "relative coefficient of performance" and "relative refrigerating capacity") with respect to those of R410A as a reference (1.000). The global warming coefficient (GWP) is a value for 100 years which is define in Intergovernmental Panel on Climate Change (IPCC), Fourth assessment report (year 2007) or is determined by the method. In this description, values of GWP are such values unless otherwise indicated. In the case of a working medium constituted of a mixture, temperature glide is an important factor for evaluating the working medium; the smaller the value thereof, the more the working medium is preferred.

[Table 1]

TABLE 1

|  | R410A | HFO-1123 |
|---|---|---|
| Relative coefficient of performance | 1.000 | 0.921 |
| Relative refrigerating capacity | 1.000 | 1.146 |
| Temperature glide [° C.] | 0.2 | 0 |
| GWP | 2088 | 0.3 |

[Optional Ingredients]

The working medium to be used in the invention preferably includes HFO-1123. The working medium may contain any desired compounds commonly used as working media, besides HFO-1123 so long as the inclusion thereof does not lessen the effect of the invention. Examples of such optionally usable compounds (optional ingredients) include HFCs, HFOs (HFCs having a carbon-carbon double bond) other than HFO-1123, and other ingredients which vaporize and liquefy together with HFO-1123. Preferred optional ingredients are HFCs and HFOs (HFCs having a carbon-carbon double bond) other than HFO-1123.

Preferred optional ingredients are compounds which, when used in heat cycling in combination with HFO-1123, have the function of further heightening the relative coefficient of performance and the relative refrigerating capacity and which, despite this, can make the GWP and the temperature glide remain in acceptable ranges. In cases when the working medium contains such a compound in combination with HFO-1123, not only this working medium retains a low GWP and has better cycle performance but also the temperature glide exerts little influence.

(Temperature Glide)

A working medium including, for example, HFO-1123 and an optional ingredient has a considerable temperature glide except for the case where the HFO-1123 and the optional ingredient are present as an azeotropic composition. The temperature glide of the working medium varies depending on the kind of the optional ingredient and the mixing ratio of HFO-1123 and optional ingredient.

In the case of using a mixture as the working medium, the mixture usually preferably is an azeotropic mixture or a pseudoazeotropic mixture such as R410A. Non-azeotropic compositions have a problem in that the compositions change in makeup when charged into refrigerators or air conditioners from pressure vessels. In addition, in the case where such a working medium has leaked from the refrigerator or air conditioner, there is an extremely high possibility that the working medium within the refrigerator or air conditioner might have changed in makeup and it is difficult to recover the initial makeup of the working medium. Meanwhile, in cases when an azeotropic or pseudoazeotropic mixture is used, these problems can be avoided.

"Temperature glide" is generally used as an index to the usability of working media which are mixtures. Temperature glide is defined as the property of differing in initiation temperature and termination temperature between vaporization and condensation in heat exchangers, for example, between vaporization in a vaporizer and condensation in a condenser. The azeotropic mixtures have a temperature glide of 0, and pseudoazeotropic mixtures have temperature glides close to 0, like R410A, which has a temperature glide of 0.2.

In the case where the temperature glide is large, this working medium has a lowered temperature at the inlet of the vaporizer to pose a problem in that frosting is highly likely to occur. Furthermore, in a heat cycle system, the working medium and the heat source fluid, such as water or air, are generally caused to flow countercurrently in a heat exchanger in order to improve the heat exchange efficiency. Since the heat source fluid has a small temperature difference in the heat cycle system which is being stably operated, it is difficult to obtain a heat cycle system having a satisfactory energy efficiency with a non-azeotropic mixture medium having a large temperature glide. Consequently, in the case where a mixture is to be used as a working medium, this working medium is desired to have an appropriate temperature glide.

(HFCs)

It is preferred to select an HFC as an optional ingredient from those standpoints. HFCs are known to have higher GWPs than HFO-1123. It is hence preferable that an HFC to be used in combination with HFO-1123 is suitably selected from the standpoints of enabling the working medium to have improved cycle performance and retain a temperature glide within an appropriate range and, in particular, of making the working medium have a GWP within an acceptable range.

Specifically, preferred HFCs which less affect the ozone layer and less affect global warming are HFCs having 1 to 5 carbon atoms. These HFCs may be linear, branched, or cyclic.

Examples of such HFCs include HFC-32, difluoroethane, trifluoroethane, tetrafluoroethane, HFC-125, pentafluoropropane, hexafluoropropane, heptafluoropropane, pentafluorobutane, and heptafluorocyclopentane.

Preferred of these HFCs, from the standpoints of reduced influence on the ozone layer and excellent refrigerating cycle properties, are HFC-32, 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), and HFC-125. More preferred are HFC-32, HFC-152a, HFC-134a, and HFC-125.

One HFC may be used alone, or two or more HFCs may be used in combination.

The content of an HFC in the working medium (100% by mass) can be selected at will in accordance with the properties required of the working medium. For example, in the case of a working medium composed of HFO-1123 and HFC-32, this working medium has an improved coefficient of performance and improved refrigerating capacity in cases when the content of HFC-32 is in the range of 1 to 99% by mass. In the case of a working medium composed of HFO-1123 and HFC-134a, this working medium has an improved coefficient of performance in cases when the content of HFC-134a is in the range of 1 to 99% by mass.

The GWPs of the preferred HFCs are as follows. The GWP of HFC-32 is 675, that of HFC-134a is 1,430, and that of HFC-125 is 3,500. From the standpoint of obtaining a working medium having a reduced GWP, HFC-32 is the most preferred optional HFC ingredient.

HFO-1123 and HFC-32 are capable of forming a pseudoazeotropic mixture which is nearly azeotropic, when used in proportions in the range of 99/1 to 1/99 in terms of mass ratio. Mixtures of the two have temperature glides close to 0 substantially irrespective of the proportions. In this respect also, HFC-32 is advantageous as an HFC to be used in combination with HFO-1123.

In the case of using HFC-32 in combination with HFO-1123 as the working medium to be used in the invention, when the amount of the working medium is taken as 100% by mass, the content of HFC-32 is specifically preferably 20% by mass or higher, more preferably 20 to 80% by mass, even more preferably 40 to 60% by mass.

In the case where the working medium to be used in the invention contains, for example, HFO-1123, preferred HFOs other than HFO-1123 are HFO-1234yf (GWP=4), HFO-1234ze(E), and HFO-1234ze(Z) (the (E) and (Z) isomers each have GWP=6), because these HFOs each have a high critical temperature and are excellent in terms of durability and the coefficient of performance. More preferred are HFO-1234yf and HFO-1234ze(E). One HFO other than HFO-1123 may be used alone, or two or more HFOs other than HFO-1123 may be used in combination. The content of HFOs other than HFO-1123 in the working medium (100% by mass) can be selected at will in accordance with the properties required of the working medium. For example, in the case of a working medium composed of HFO-1123 and either HFO-1234yf or HFO-1234ze, this working medium has an improved coefficient of performance in cases when the content of HFO-1234yf or HFO-1234ze is in the range of 1 to 99% by mass.

In the case where the working medium to be used in the invention includes HFO-1123 and HFO-1234yf, a preferred composition range is shown below as composition range (S).

In the expressions indicating the composition range (S), the abbreviation of each compound shows the proportion (% by mass) of the compound to the total amount of the HFO-1123, HFO-1234yf, and other ingredients (HFC-32, etc.).

<Composition Range (S)>

HFO-1123+HFO-1234yf≥70 mass %

95 mass %≥HFO-1123/(HFO-1123+HFO-1234yf)≥35 mass %

The working medium which satisfies the composition range (S) has an exceedingly low GWP and a small temperature glide. This working medium can exhibit high refrigerating cycle performance which renders the working medium usable as a substitute for the conventional R410A from the standpoints of the coefficient of performance, refrigerating capacity, and critical temperature.

In the working medium satisfying the composition range (S), the proportion of HFO-1123 to the sum of HFO-1123 and HFO-1234yf is more preferably 40 to 95% by mass, even more preferably 50 to 90% by mass, especially preferably 50 to 85% by mass, most preferably 60 to 85% by mass.

When the amount of the working medium is taken as 100% by mass, the total content of HFO-1123 and HFO-1234yf in the working medium is more preferably 80 to 100% by mass, even more preferably 90 to 100% by mass, especially preferably 95 to 100% by mass.

The working medium to be used in the invention preferably includes HFO-1123, HFC-32, and HFO-1234yf. In the case of the working medium including HFO-1123, HFO-1234yf, and HFC-32, a preferred composition range (P) is as follows.

In the expressions indicating the composition range (P), the abbreviation of each compound shows the proportion (% by mass) of the compound to the total amount of the HFO-1123, HFO-1234yf, and HFC-32. This applies to composition range (R), composition range (L), and composition range (M). In the composition range shown below, it is preferable that the sum of the specifically shown contents of HFO-1123, HFO-1234yf, and HFC-32 is higher than 90% by mass but not higher than 100% by mass based on the whole amount of the working medium for heat cycling.

<Composition Range (P)>
70 mass %≤HFO-1123+HFO-1234yf
30 mass %≤HFO-1123≤80 mass %
0 mass %<HFO-1234yf≤40 mass %
0 mass %<HFC-32≤30 mass %
HFO-1123/HFO-1234yf≤95/5 mass %

The working medium having the composition is a working medium in which the properties possessed by HFO-1123, HFO-1234yf, and HFC-32 are exhibited while attaining a satisfactory balance thereamong and in which the drawbacks of these ingredients are mitigated. Namely, this working medium has an exceedingly low GWP and, when used in heat cycling, has a small temperature glide and a certain degree of ability and efficiency, thereby attaining satisfactory cycle performance. It is preferable that the sum of HFO-1123 and HFO-1234yf is 70% by mass or more of the total amount of HFO-1123, HFO-1234yf, and HFC-32.

A more preferred composition of the working medium to be used in the invention is one which contains 30 to 70% by mass HFO-1123, 4 to 40% by mass HFO-1234yf, and 0 to 30% by mass HFC-32, based on the total amount of the HFO-1123, HFO-1234yf, and HFC-32 and in which the content of HFO-1123 is 70% by mole or less based on the whole working medium. The working medium having a composition within that range shows higher effects in terms of the properties shown above and is a highly durable working medium in which the HFO-1123 is inhibited from undergoing a self-decomposition reaction. From the standpoint of the relative coefficient of performance, the content of HFC-32 is preferably 5% by mass or higher, more preferably 8% by mass or higher.

In the case where the working medium to be used in the invention includes HFO-1123, HFO-1234yf, and HFC-32, another preferred composition is as follows. In cases when the content of HFO-1123 is 70% by mole or less based on the whole working medium, the HFO-1123 is inhibited from undergoing a self-decomposition reaction and this working medium has high durability.

A more preferred composition range (R) is shown below.
<Composition Range (R)>
10 mass %≤HFO-1123<70 mass %
0 mass %<HFO-1234yf≤50 mass %
30 mass %<HFC-32≤75 mass %

The working medium having the composition is a working medium in which the properties possessed by HFO-1123, HFO-1234yf, and HFC-32 are exhibited while attaining a satisfactory balance thereamong and in which the drawbacks of these ingredients are mitigated. Namely, this working medium has a low GWP and intact durability and has a small temperature glide and high ability and efficiency when used in heat cycling, thereby attaining satisfactory cycle performance.

A preferred range for the working medium of the invention which has the composition range (R) is shown below.
20 mass %≤HFO-1123<70 mass %
0 mass %<HFO-1234yf≤40 mass %
30 mass %<HFC-32≤75 mass %

The working medium having the composition is a working medium in which the properties possessed by HFO-1123, HFO-1234yf, and HFC-32 are exhibited while attaining a satisfactory balance thereamong and in which the drawbacks of these ingredients are mitigated. Namely, this working medium has a low GWP and intact durability and has a smaller temperature glide and higher ability and efficiency when used in heat cycling, thereby attaining satisfactory cycle performance.

A more preferred range (L) for the working medium of the invention which has the composition range (R) is shown below. The composition range (M) is even more preferred.
<Composition Range (L)>
10 mass %≤HFO-1123<70 mass %
0 mass %<HFO-1234yf≤50 mass %
30 mass %<HFC-32≤44 mass %
<Composition Range (M)>
20 mass %≤HFO-1123<70 mass %
5 mass %≤HFO-1234yf≤40 mass %
30 mass %<HFC-32≤44 mass %

The working medium having the composition range (M) is a working medium in which the properties possessed by HFO-1123, HFO-1234yf, and HFC-32 are exhibited while attaining a highly satisfactory balance thereamong and in which the drawbacks of these ingredients are mitigated. Namely, this working medium is a working medium which has a GWP as low as 300 or less at the most and has intact durability and which, when used in heat cycling, has a temperature glide as small as below 5.8 and has a relative coefficient of performance and a relative refrigerating capacity both close to 1, thereby attaining satisfactory cycle performance.

In cases when the composition is within that range, the temperature glide has a reduced upper limit and the value of (relative coefficient of performance)×(relative refrigerating capacity) has an increased lower limit. From the standpoint of attaining a large value of the relative coefficient of performance, the proportion of HFO-1234yf is more preferably 8% by mass or larger. From the standpoint of attaining high relative refrigerating capacity, the proportion of HFO-1234yf is more preferably 35% by mass or less.

Another preferred working medium for use in the invention preferably includes HFO-1123, HFC-134a, HFC-125, and HFO-1234yf. This composition is effective in making the working medium have reduced combustibility.

A more preferred working medium is one which includes HFO-1123, HFC-134a, HFC-125, and HFO-1234yf and in which: the total proportion of HFO-1123, HFC-134a, HFC-125, and HFO-1234yf to the whole working medium is larger than 90% by mass but not larger than 100% by mass; the proportion of HFO-1123 to the sum of HFO-1123, HFC-134a, HFC-125, and HFO-1234yf is 3 to 35% by mass; the proportion of HFC-134a to said sum is 10 to 53% by mass; the proportion of HFC-125 to said sum is 4 to 50% by mass; and the proportion of HFO-1234yf to said sum is 5 to 50% by mass. This working medium is noncombustible and highly safe, less affects the ozone layer and global warming, and can have better cycle performance when used in heat cycle systems.

A most preferred working medium is one which includes HFO-1123, HFC-134a, HFC-125, and HFO-1234yf and in which: the total proportion of HFO-1123, HFC-134a, HFC-125, and HFO-1234yf to the whole working medium is larger than 90% by mass but not larger than 100% by mass; the proportion of HFO-1123 to the sum of HFO-1123, HFC-134a, HFC-125, and HFO-1234yf is 6 to 25% by mass; the proportion of HFC-134a to said sum is 20 to 35% by mass; the proportion of HFC-125 to said sum is 8 to 30% by mass; and the proportion of HFO-1234yf to said sum is 20 to 50% by mass. This working medium is noncombustible and even safer, even less affects the ozone layer and global warming, and can have even better cycle performance when used in heat cycle systems.

(Other Optional Ingredients)

The working medium to be used as the composition for use in the heat cycle system of the invention may contain carbon dioxide, hydrocarbons, chlorofluoroolefins (CFOs), hydrochlorofluoroolefins (HCFOs), etc. besides the optional ingredients shown above. Such other optional ingredients preferably are ingredients which less affect the ozone layer and less affect global warming.

Examples of the hydrocarbons include propane, propylene, cyclopropane, butane, isobutane, pentane, and isopentane.

One hydrocarbon may be used alone, or two or more hydrocarbons may be used in combination.

In the case where the working medium contains a hydrocarbon, when the amount of working medium is taken as 100% by mass, the content thereof is less than 10% by mass, preferably 1 to 5% by mass, more preferably 3 to 5% by mass. In cases when the working medium has a hydrocarbon content not less than the lower limit, mineral-oil-based refrigerating machine oils have better solubility in this working medium.

Examples of the CFOs include chlorofluoropropenes and chlorofluoroethylenes. From the standpoint of easily reducing the combustibility of the working medium without considerably lowering the cycle performance of the working medium, preferred CFOs are 1,1-dichloro-2,3,3,3-tetrafluoropropene (CFO-1214ya), 1,3-dichloro-1,2,3,3-tetrafluoropropene (CFO-1214yb), and 1,2-dichloro-1,2-difluoroethylene (CFO-1112).

One CFO may be used alone, or two or more CFOs may be used in combination.

In the case where the working medium contains a CFO, when the amount of the working medium is taken as 100% by mass, the content thereof is less than 10% by mass, preferably 1 to 8% by mass, more preferably 2 to 5% by mass. In cases when the CFO content is not less than the lower limit, the combustibility of this working medium is easy to reduce. In cases when the CFO content is not higher than the upper limit, satisfactory cycle performance is easy to obtain.

Examples of the HCFOs include hydrochlorofluoropropenes and hydrochlorofluoroethylenes. From the standpoint of easily reducing the combustibility of the working medium without considerably lowering the cycle performance of the working medium, preferred HCFOs are 1-chloro-2,3,3,3-tetrafluoropropene (HCFO-1224yd) and 1-chloro-1,2-difluoroethylene (HCFO-1122).

One HCFO may be used alone, or two or more HCFOs may be used in combination.

In the case where the working medium contains an HCFO, when the amount of the working medium is taken as 100% by mass, the content of the HCFO in the working medium is less than 10% by mass, preferably 1 to 8% by mass, more preferably 2 to 5% by mass. In cases when the HCFO content is not less than the lower limit, the combustibility of this working medium is easy to reduce. In cases when the HCFO content is not higher than the upper limit, satisfactory cycle performance is easy to obtain.

In the case where the working medium to be used in the invention contains other optional ingredients such as those shown above, when the amount of the working medium is taken as 100% by mass, the total content of the other optional ingredients in the working medium is less than 10% by mass, preferably 8% by mass or less, more preferably 5% by mass or less.

According to the compressor 100 and the heat cycle system according to embodiments of the present invention, even a working medium which is prone to undergo a self-decomposition reaction can be prevented from undergoing a sparking-induced self-decomposition reaction in the compressor 100. The compression and heat cycle operations can hence be performed stably.

In the embodiments shown above, a scroll compressor was explained as an example of the compressor 100. However, the present invention is applicable to various compressors so long as the compression part 30 is provided in an upper part of the inside of a sealed container and the electric drive part 50 is provided in a lower part thereof. For example, the present invention is suitable also for application to a rotary compressor which is equipped with a rotary piston, a cylinder, a vane, etc. and in which a working medium is compressed by the rolling movement of the rotary piston.

While the invention is described in detail and with reference to specific embodiments thereof, it will be apparent to one skilled in the art that various changes and modifications can be made therein without departing from the spirit and scope thereof. This application is based on a Japanese patent application filed on Feb. 22, 2016 (Application No. 2016-31193), the contents thereof being incorporated herein by reference.

DESCRIPTION OF REFERENCE NUMERALS

10 Sealed container
15 Oil reservoir part
20 Suction pipe
21 Discharge pipe
30 Compression part
31 Fixed scroll
32 Rocking scroll
40 Shaft
50 Electric drive part
51 Motor
52 Rotor
53 Stator
57 Lead wire
58 Connector
60 Power source terminal
61 External terminal
62 Insulating member
63 Internal terminal
70 Lubricating oil
100 Compressor
150 Air conditioner

The invention claimed is:

1. A compressor comprising:
   a sealed container;
   a compression part provided in an upper part of the inside of the sealed container and configured to compress a working medium;
   an oil reservoir part provided in a bottom part of the inside of the sealed container and configured to reserve a lubricating oil therein;
   an electric drive part provided between the compression part and the oil reservoir part inside the sealed container and configured to drive the compression part; and
   a power source terminal provided to pass through a wall surface of the sealed container in a region of the oil reservoir part, the power source terminal being connectable to an external power source outside the sealed container and electrically connected to the electric drive part via a lead wire in the sealed container,
   wherein the power source terminal comprises an exposed metallic-terminal portion inside the sealed container, and the exposed metallic-terminal portion is entirely immersed in the lubrication oil.

2. The compressor according to claim 1, wherein the lead wire is connected to the power source terminal by a connector, and the connector and at least a part of the lead wire are immersed in the lubricating oil.

3. A heat cycle system comprising:
   the compressor according to claim 2; and
   a refrigerant circuit to which the compressor is connected and through which the working medium circulates.

4. The compressor according to claim 1, wherein the power source terminal is provided to a sidewall portion of the wall of the sealed container in the region of the oil reservoir part.

5. A heat cycle system comprising:
   the compressor according to claim 4; and
   a refrigerant circuit to which the compressor is connected and through which the working medium circulates.

6. The compressor according to claim 1, wherein the working medium comprises a hydrofluoroolefin (HFO).

7. The compressor according to claim 6, wherein the HFO comprises HFO-1123.

8. The compressor according to claim 7, wherein the working medium is a working medium consisting of HFO-1123, a working medium comprising a mixture of HFO-1123 and HFC-32, or a working medium comprising a mixture of HFO-1123 and HFO-1234yf.

9. A heat cycle system comprising:
   the compressor according to claim 1; and
   a refrigerant circuit to which the compressor is connected and through which the working medium circulates.

10. The compressor according to claim 1, further comprising a sub-frame partitioning a space inside the sealed container and positioned between the electric drive part and the oil reservoir part.

11. The compressor according to claim 10, wherein a through hole passing the lead wire is formed in the sub-frame.

12. The compressor according to claim 11, wherein the lead wire is connected to the power source terminal by a connector, and the connector and at least a part of the lead wire are immersed in the lubricating oil.

13. The compressor according to claim 11, wherein the power source terminal is provided to a sidewall portion of the wall of the sealed container in the region of the oil reservoir part.

14. The compressor according to claim 11, wherein the working medium comprises a hydrofluoroolefin (HFO).

15. The compressor according to claim 14, wherein the HFO comprises HFO-1123.

16. The compressor according to claim 15, wherein the working medium is a working medium consisting of HFO-1123, a working medium comprising a mixture of HFO-1123 and HFC-32, or a working medium comprising a mixture of HFO-1123and HFO-1234yf.

17. A heat cycle system comprising:
    the compressor according to claim 10; and
    a refrigerant circuit to which the compressor is connected and through which the working medium circulates.

18. A heat cycle system comprising:
    the compressor according to claim 11; and
    a refrigerant circuit to which the compressor is connected and through which the working medium circulates.

* * * * *